Patented Mar. 12, 1940

2,193,529

UNITED STATES PATENT OFFICE 2,193,529

POLYAMIDES

Donald Drake Coffman, Wilmington, Del., assignor to E. I. du Pont de Nemours & Company, Wilmington, Del., a corporation of Delaware No Drawing. Application June 5, 1936, Serial No. 83,810

4 Claims. (Cl. 260—78)

This invention relates to new compositions of matter, and more particularly to mixtures of high molecular weight polyamides.

In Patents 2,071,250, 2,071,251, 2,071,252, and 2,071,253 there are disclosed various superpolymers which can be drawn into strong fibers showing by X-ray examination orientation along the fiber axis. Among the most useful of the fiber-forming materials are the superpolyamides which are of two general classes, namely, those derived from amino acids and those derived from diamines plus dibasic acids. Fibers derived from these products vary considerably in their properties depending upon the reactants used in their preparation. However, they are all characterized by high tenacity, high orientation, lack of sensitivity to conditions of humidity, exceptionally good elastic recovery, extraordinary resistance to most solvents and chemical agents, good dyeing qualities, and exceptionally good aging characteristics in air even at moderately elevated temperatures. However, certain of these products yield fibers having melting points too low for satisfactory use in textile manufacture. Thus, while superpolyamides melting much below 220° C. may yield textiles of very good strength, these textiles soften at the temperatures commonly used in ironing and for this reason are unsatisfactory for many purposes. This means that a large number of superpolyamides, i. e., those having a melting point below 220° C., cannot very successfully be used as such in the preparation of textiles which must withstand conditions of hot ironing.

I have now found that the melting point of these low-melting superpolyamides can be greatly increased and brought into the useful range by admixing them with a high-melting superpolyamide. The superpolyamide mixtures have very unusual and unexpected melting point characteristics. They do not yield minimum melting mixtures (M. P. lower than that of either component) which is characteristic of most mixtures of crystalline components. The melting points of the mixed polymers lie between the melting points of the two components and very markedly on the side of the higher melting constituent.

The mixed polyamides of this invention should not be confused with interpolymers which are prepared by polymerizing a mixture of the monomeric reactants used in synthesizing the polymers, as for instance the chemically mixed product or interpolymer obtained by reacting a mixture of two diamines with two dibasic acids. Such interpolymers have been referred to in the applications above mentioned but the melting points of the interpolymers follow the more usual rule of lowering the average melting point. The mixture of preformed polyamides of this invention, on the other hand, raises the average melting point of the constituents, as will be seen from the examples given below.

This invention has as an object the preparation of compositions useful in the preparation of textile fibers, sheets, films, coating compositions, adhesives, impregnating compositions, molded articles, and the like. A further object is to utilize superpolyamides of low melting point in the preparation of fiber-forming compositions of high melting point. A further object is to modify the properties of polyamides. A further object is to utilize superpolyamides having a melting point below 220° C. in the preparation of fiber-forming compositions having a melting point above 220°. A still further object is to add to a high-melting superpolyamide a substantial amount of a substance which will not materially alter the melting point or fiber qualities of the high-melting superpolyamide. Other objects will appear hereinafter.

In the broader aspect of the invention these objects are accomplished by intimately mixing two or more polyamides. As applied to the preparation of textile compositions, these objects are accomplished by mixing a high-melting superpolyamide and a low-melting polyamide, and preferably by adding a sufficient amount, sometimes as little as a few per cent but generally from 25% to 75%, of a high-melting superpolyamide to a low-melting superpolyamide to give a composition having a melting point within 10° of the higher melting constituent.

The preparation of the initial polyamides is described in detail in the above mentioned applications. The polyamide-forming reactants are heated to reaction temperature, usually from 100–300° C., and preferably at 150–275° C., in the presence or absence of a solvent or diluent until a polymer of the desired properties is formed. Thus, polyhexamethylene adipamide may be prepared by heating 26.4 parts hexamethylenediamine, 33.2 parts of adipic acid, and 60 parts of mixed xylenols (boiling 218–223° C.) in a vessel fitted with a means for returning solvent lost by distillation, a means for introducing nitrogen, a thermometer, and a viscometer. The mixture, after being heated for 7 hours by the vapors of boiling naphthalene, had an intrinsic viscosity of 0.67, a melting point of 248° C., and excellent fiber-forming properties. This polymer is made up of recurring structural units of chain length 14 as represented by the formula

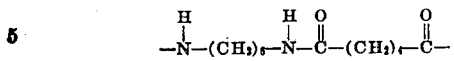

While polyamides of this general type can be prepared from a wide variety of diamines and dibasic acids, it is preferable to select the diamine and dibasic acid such that the unit or chain length of the recurring unit is at least 9.

A specific procedure I have used for making a superpolyamide from a polymerizable amino acid is as follows: Approximately 50 g. of 6-aminocaproic acid was heated for 0.5 hour at 220–225° C. at atmospheric pressure. Nearly the theoretical amount of water distilled off during this period. The residue was a hard opaque solid. It was a polyamide of 6-aminocaproic acid mixed with a small proportion of the corresponding monomeric lactam. It did not show fiber-forming properties. This material was heated further at 225–230° C. under a pressure less than 1 mm. of mercury. A small amount of the monomeric lactam was removed in this way and the residue was converted into a fiber-forming superpolymer. The superpolyamide was a hard, tough, opaque, white mass which melted at 205–210° C. to a transparent mass that was barely capable of flowing. The polymer had excellent spinning properties, yielding strong, pliable, highly oriented fibers. This polymer has a unit length of 7 and may be represented by the formula

The following examples, in which the parts are by weight, are illustrative of the method of carrying out my invention:

EXAMPLE I

The high-melting superpolyamide used in this example was polyhexamethylene adipamide derived from hexamethylenediamine and adipic acid as described above, and the low-melting superpolyamide was polypentamethylene sebacamide similarly derived from pentamethylenediamine and sebacic acid. Intimate mixtures of these polymers in various proportions were prepared by dissolving known quantities of the two superpolyamides in xylenol and precipitating them therefrom by the addition of ethanol. This gave a quantitative yield of mixed polymer in the form of a white powder. Melting point data on these mixtures, presented below in Table I, clearly show the surprisingly high melting points exhibited by these mixtures. It will be noted that addition of 10% of the higher melting polymer to the lower melting polymer raised the melting point of the latter by approximately 13°, whereas addition of 10% of the lower melting polymer to the higher melting polymer lowered the melting point of the latter by only 2°. It will be noted further that the melting point of the mixture containing equal amounts of the two polymers is 45° above that of the lower melting component and only 3° below that of the higher melting component.

The behavior of the mixed polyamides described above is in sharp contrast with that of interpolymers prepared by co-polymerization of hexamethylenediamine and adipic acid with pentamethylenediamine and sebacic acid, for which melting point data are presented in Table II. Table II shows that the interpolymer comparable in composition with that containing equal amounts of polyhexamethylene adipamide and polypentamethylene sebacamide melts approximately 40° below polypentamethylene sebacamide and 80° below the mechanically mixed polymer of the same composition. The small difference in the melting point of polyhexamethylene adipamide as given in the tables is due to the fact that different samples were used. Such small differences are sometimes observed and appear to be due to variation in the method of preparation. The mixed polymers gave good fibers whose melting points were comparable with those of the mixtures used.

TABLE I

Melting points of mixed polyamides

| Parts of polyhexamethylene adipamide | Parts of polypentamethylene sebacamide | Melting point. °C. |
|---|---|---|
| 0 | 100 | 194 |
| 10 | 90 | 205–210 |
| 25 | 75 | 235–238 |
| 50 | 50 | 239–240 |
| 75 | 25 | 239–240 |
| 90 | 10 | 240 |
| 100 | 0 | 242 |

TABLE II

Melting points of polyamide interpolymers

| Parts of polyhexamethylene adipamide represented | Parts of polypentamethylene sebacamide represented | Melting point °C. |
|---|---|---|
| 0 | 100 | 194 |
| 10 | 90 | 176–178 |
| 25 | 75 | 161–163 |
| 50 | 50 | 155–157 |
| 75 | 25 | 203–205 |
| 90 | 10 | 229–231 |
| 100 | 0 | 245 |

EXAMPLE II

Mechanical mixtures of polydecamethylene adipamide, prepared from decamethylenediamine and adipic acid, and polypentamethylene sebacamide, derived from pentamethylenediamine and sebacic acid, were prepared in the manner described in Example I. Melting point data for these mixtures are given in Table III. The mixtures gave fibers of excellent properties. The melting point of the fibers was substantially the same as that of the massive mixed polymer from which they were prepared.

TABLE III

Melting points of mixed polyamides

| Parts of polydecamethylene adipamide | Parts of polypentamethylene sebacamide | Melting point, °C. |
|---|---|---|
| 0 | 100 | 194 |
| 10 | 90 | 213–215 |
| 25 | 75 | 218–220 |
| 50 | 50 | 222–224 |
| 75 | 25 | 224–226 |
| 90 | 10 | 226–228 |
| 100 | 0 | 227–228 |

EXAMPLE III

Mixtures of 6-aminocaproic acid polymer and polyhexamethylene adipamide were made by dissolving the polymers in m-cresol at 200° C. and precipitating them therefrom by means of alcohol. Data for the mixed polymers are presented below in Table IV. The mixed polymers yielded fibers of good quality.

TABLE IV

*Melting points of mixed polyamides*

| Parts of poly-hexamethylene adipamide | Parts of 6-aminocaproic acid polymer | Melting point, °C. |
|---|---|---|
| 0 | 100 | 200–202 |
| 10 | 90 | 206–208 |
| 25 | 75 | 217–220 |
| 50 | 50 | 242–245 |
| 75 | 25 | 245–247 |
| 90 | 10 | 245–247 |
| 100 | 0 | 248 |

The compositions of this invention are prepared by intimately mixing polyamides. This may be done by dissolving the polymers in a common solvent and precipitating them therefrom as described in the foregoing examples or they may be mechanically mixed in the dry form by suitable mixing devices.

While only three specific examples are given of the utilization of low-melting superpolyamides in the preparation of high-melting superpolyamide compositions of use in the preparation of textile fibers, this by no means exhausts the possibilities of this invention. A vast number of combinations are possible; in general, it is desirable to use only two superpolyamides in the preparation of the compositions. Superpolyamides which are especially useful in increasing the melting point of low-melting superpolyamides are given below in Table V, column A; a representative list of low-melting superpolyamides, whose melting points can be increased and brought into the range useful for textile fibers, are given in column B of Table V. It is obvious that this list presents a very comprehensive number of possible combinations. The table includes superpolyamides of both the amino acid and diamine-dibasic acid types of which the latter is the preferred type.

*High and low-melting superpolyamides*

| A (high-melting) | | B (low-melting) | |
|---|---|---|---|
| Polymer | M. P. (°C.) | Polymer | M. P. (°C.) |
| Tetramethylene adipamide. | 278 | Pentamethylene glutaramide. | 198 |
| Tetramethylene suberamide. | 250 | Pentamethylene pimelamide. | 183 |
| Tetramethylene sebacamide. | 239 | Pentamethylene suberamide. | 202 |
| Hexamethylene adipamide. | 245 | Pentamethylene azelamide. | 178 |
| Octamethylene adipamide. | 235 | Pentamethylene sebacamide. | 202 |
| Decamethylene p-phenylene diacetamide. | 242 | Pentamethylene brassylamide. | 176 |
| p-Xylylenediamine sebacamide. | 268 | Hexamethylene sebacamide. | 209 |
| | | Octamethylene sebacamide. | 197 |
| | | Decamethylene sebacamide. | 194 |
| | | 6-aminocaproic acid polymer. | 201 |
| | | 9-aminononanoic acid polymer. | 195 |

Although all types of polyamides may be used in this invention, it is desirable in the preparation of textile compositions that at least one of the ingredients of the mixture be a superpolyamide derived from a diamine of formula $NH_2CH_2RCH_2NH_2$ and a dicarboxylic acid of formula $HOOCCH_2R'CH_2COOH$ (or an amide-forming derivative thereof), in which R and R' are divalent hydrocarbon radicals free from non-benzenoid unsaturation and in which R has a chain length of at least two carbon atoms. It will be noted that all of the members of Table V, with the exception of the last two members in column B, are of this class. Members of this class have exceptionally good spinning qualities and yield fibers of very desirable properties for use in textiles. Moreover, many of them can be prepared from fairly accessible compounds. For these reasons the compositions of this invention are generally made up entirely of superpolyamides of this class.

As already stated, it is desirable that textile fibers have a melting point above 220° C. In its preferred embodiment, therefore, this invention consists in preparing polyamide compositions having a melting point above 220° C. using as one ingredient a superpolyamide melting below 220° C. and another superpolyamide melting above 220° C. and, preferably above 230° C. The compositions are prepared by intimately mixing the ingredients in proportions which will give compositions melting above 220° C. The ratio in which the ingredients are mixed will depend somewhat upon their melting points and on the melting point of the composition desired. Since the melting point of the mixture lies predominately on the side of the higher melting component, it is possible to add large amounts, generally as much as 75% of the lower melting ingredient to the higher melting ingredient without lowering the melting point of the latter by more than 10° C. The preferred compositions of this invention therefore consist of those derived from a mixture of a superpolyamide melting above 220° C., preferably above 230° C., with a superpolyamide melting below 220° C., said composition containing up to 75% of the lower melting ingredient. Since polyhexamethylene adipamide possesses a relatively high melting point, good fiber properties, and can be prepared from readily accessible materials, it is especially useful as the high-melting component in these compositions. However, other members in column A of Table V are also very useful for this purpose.

While the most important use of the polyamide mixtures described herein is in the preparation of fibers, the invention is useful for other purposes and comprehends the mixture of polyamides generally, including mixtures of non-fiber-forming polyamides and mixtures of non-fiber-forming polyamides with superpolyamides. The mixed polyamides may be used as such or in conjunction with other substances, such as solvents, plasticizers, dyes, cellulose derivatives, resins, oils, polymers, etc.

As previously indicated, the fiber-forming superpolyamides used in the practice of the present invention are fusible without decomposition, and show under X-ray examination a crystalline structure in the massive state. They may be spun into continuous filaments which can be cold-drawn into strong, tough, flexible, highly elastic fibers, showing by characteristic X-ray patterns orientation along the fiber axis. These fibers can be tied into hard knots without materially decreasing their tenacity. They may be formed into thread or yarn which can be knitted or woven into very useful fabrics.

This invention provides a valuable method for increasing the utility of polyamides. It is especially useful in that it affords a means for utilizing low-melting superpolyamides in the preparation of textile fibers of high-melting point. Since certain of the low-melting superpolyamides have very excellent fiber qualities and can be prepared from readily accesible reactants, this is a very useful development. The addition of the low-melting superpolyamides to the high-melting superpolyamides does not in general detract from the utility of the latter as textile fibers; in some cases it actually improves their spinning qualities and fiber properties. Since certain of the low-melting superpolyamides are relatively cheap, the economic advantages of the invention will be apparent. The present invention also greatly increases the number of superpolyamides which may be used in the preparation of textile fibers of good melting point characteristics. As indicated above, the utility of this invention is not limited to superpolyamides or to the preparation of textile composition; it applies to all polyamides and to the preparation of compositions useful for molding, sizing, impregnation, coating, etc.

As many apparently widely different embodiments of this invention may be made without departing from the spirit and scope thereof, it is to be understood that I do not limit myself to the specific embodiments thereof except as defined in the appended claims.

I claim:

1. A composition comprising a mixture of different, separately produced, synthetic polyamides at least one of which is capable of being drawn into fibers showing by characteristic X-ray patterns orientation along the fiber axis, the mixture solely of the polyamides having a melting point substantially higher than the average melting point of the component polyamides.

2. The composition set forth in claim 1 in which one of said polyamides is derived from a diamine of the formula $NH_2CH_2RCH_2NH_2$ and a compound of the class consisting of dicarboxylic acids of the formula $HOOCCH_2R'CH_2COOH$, and amide-forming derivatives thereof, in which R and R' in said formulae are divalent hydrocarbon radicals free from non-benzenoid unsaturation and R has a chain length of at least two carbon atoms.

3. The composition set forth in claim 1 in which the polyamide capable of being drawn into fibers is polyhexamethylene adipamide.

4. A composition comprising a mixture of synthetic polyamides containing at least two different separately produced, polyamides each of which is capable of being drawn into fibers showing by characteristic X-ray patterns orientation along the fiber axis, the mixture solely of the polyamides having a melting point substantially higher than the average melting point of the component polyamides.

DONALD D. COFFMAN.